(No Model.)
H. PARMELEE.
PIPE WRENCH.
No. 590,853. Patented Sept. 28, 1897.
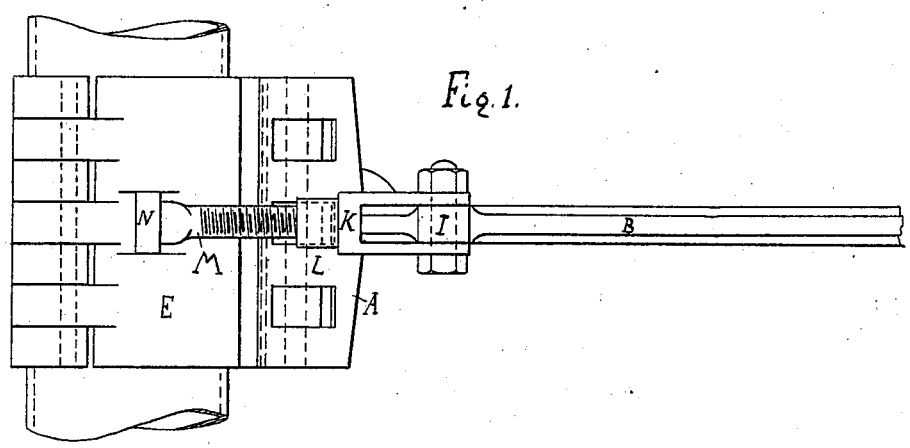
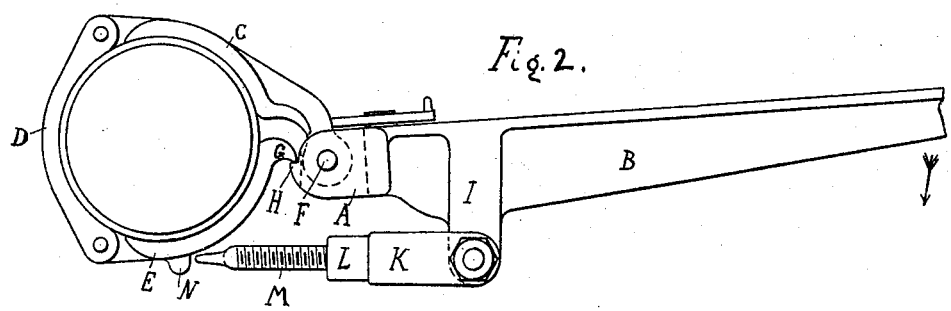
WITNESSES
INVENTOR.
BY
ATTORNEY

UNITED STATES PATENT OFFICE.

HOMER PARMELEE, OF PHILADELPHIA, PENNSYLVANIA.

PIPE-WRENCH.

SPECIFICATION forming part of Letters Patent No. 590,853, dated September 28, 1897.

Application filed February 24, 1897. Serial No. 624,872. (No model.)

*To all whom it may concern:*

Be it known that I, HOMER PARMELEE, a citizen of United States, residing at Philadelphia, in the county of Philadelphia and State of Pennsylvania, have invented certain new and useful Improvements in Pipe-Grips; and I do hereby declare the following to be a full, clear, and exact description of the invention, such as will enable others skilled in the art to which it appertains to make and use the same.

My invention relates to improvements in pipe-grips; and it has for its object to furnish a pipe-fitter's tool that will enable the artisan to get a secure grip on the pipe and at the same time avoid any danger of breaking the tool should a larger strain have to be put on the stock to turn the pipe than is required to grip it sufficiently tight. I obtain these objects by the construction shown in the accompanying drawings, in which—

Figure 1 is a top view of my invention, and Fig. 2 is a side view of the same.

Similar letters refer to similar parts throughout both views.

Referring by letter to the accompanying drawings, A designates the fulcrum-piece of the grip, said fulcrum-piece being provided with an extension B, the latter forming the operating-lever of the tool.

The link C of chain C D E is pivotally attached or hinged to the fulcrum-piece A by bolt F. Links C D E of the chain are of a suitable shape and form the girth of the tool. End link E is provided with an outwardly-projecting lip G on its normally free end; and when the grip is closed around the pipe this lip G engages with a transverse shoulder H on the fulcrum-piece A. When in this position, a motion of the lever in the direction of the arrow, Fig. 2, will tighten the grip on the pipe with sufficient force to prevent it from slipping and to enable a turning motion to be imparted to the pipe.

As especially in larger sizes of pipes it very often happens that a larger force has to be applied to the operating-lever for the purpose of twisting the pipe than is necessary for securing a tight grip on the latter, there is some danger of unnecessarily straining or even breaking the girth or the fulcrum of the tool. To avoid this danger, I provide for an adjustable stop by which the fulcrum and girth can be relieved of any strain over and above that required to tighten the girth on the pipe. The adjustable stop I prefer to use is shown in the accompanying drawings, and consists of a lug I, either attached to or integral with the operating-lever B. To this lug a link K is hinged, said link being provided at its free end with a nut L, into which is screwed a rod M. On link E a small projection or stop N is formed, against which rod M impinges. In placing the grip around the pipe rod M is adjusted to allow sufficient motion to be given to the lever B to tighten the grip before M impinges against N, and it is evident that after this is accomplished any additional strain placed on the lever will be directly imparted to rod M and will not tend to produce a further and entirely unnecessary grip on the pipe.

What I claim, and desire to secure by Letters Patent, is—

1. In a pipe-wrench, in combination with lever B, provided at one end with fulcrum-piece A; chain C, D, E, composed of links of suitable shape, hinged to the fulcrum-piece A; an outwardly-projecting lip G on the free end of the end link E of the chain, said lip being adapted to engage with transverse shoulder H on fulcrum-piece A; and an adjustable stop attached to lever B and engaging with end link E, and adapted to receive any strain over and above that required to cause the chain to grip the pipe, substantially as set forth.

2. In a pipe-wrench, in combination with lever B, fulcrum-piece A; chain C, D, E, lug I, attached to or formed on lever B, link K provided with nut L, and hinged to lug I, and rod M screwed into nut L and adapted to impinge on lug N on the end link E of the chain C, D, E, for the purpose specified.

In testimony whereof I affix my signature in presence of two witnesses.

HOMER PARMELEE.

Witnesses:
WILLIAM E. STOKES,
CHAS. H. BANNARD.